April 23, 1968  L. H. LOGUE  3,379,415
CENTER TOWER AGITATOR FOR SLURRIES
Filed May 3, 1965  2 Sheets-Sheet 2
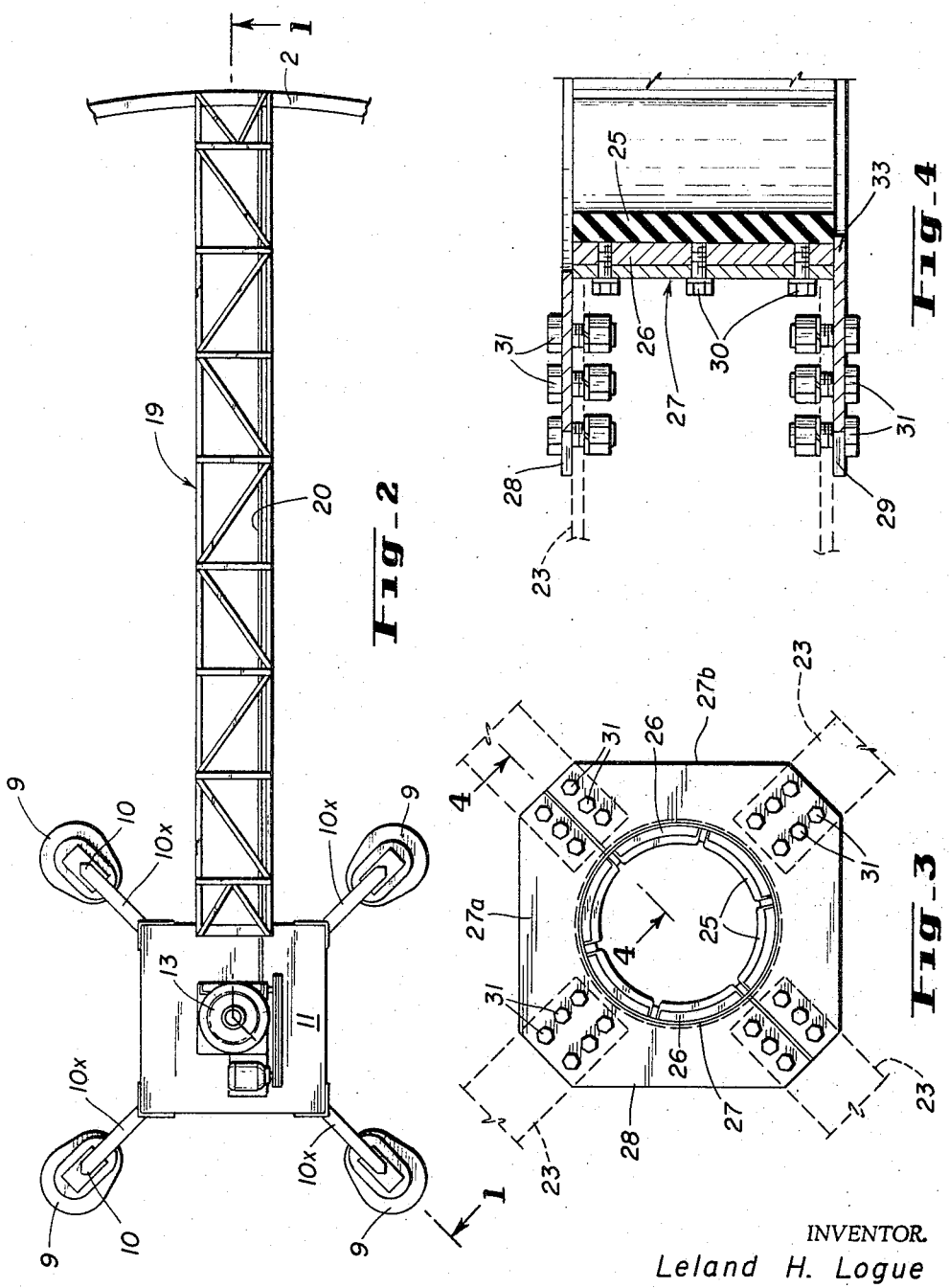
INVENTOR.
Leland H. Logue
BY
ATTORNEYS

Patent 3,379,415 — Center Tower Agitator for Slurries

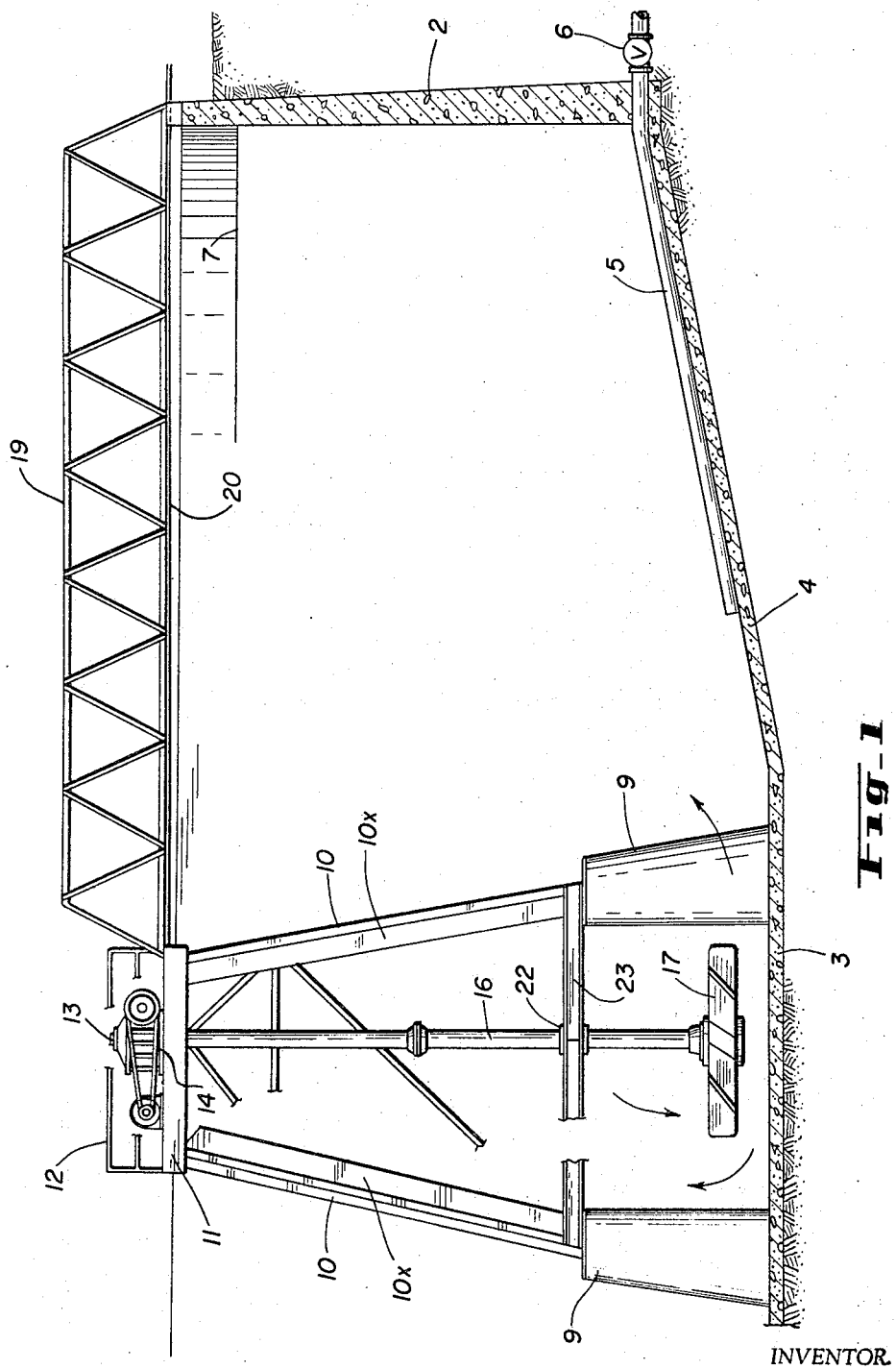

3,379,415
CENTER TOWER AGITATOR FOR SLURRIES
Leland H. Logue, Denver, Colo., assignor to Denver Equipment Company, Denver, Colo., a corporation of Colorado
Filed May 3, 1965, Ser. No. 452,698
15 Claims. (Cl. 259—44)

This invention relates to agitators for slurries and pulps and more particularly relates to agitators of large volume capacity having diameters which may be in excess of 100 feet.

In many ore processing and chemical treatment plants, particularly those treating minerals obtained in mining operations, it is customary to conduct the mining operation on a five-day week, whereas the treatment plant or refinery will operate on a seven-day week. In such operations, the product from mining is reduced to a pulp or slurry and is stored in large tanks. At the end of the last mine working day of the week, the mining operation is stopped and the treatment plant is supplied by drawing from the large storage tanks until mining operations are resumed at the beginning of the next week's operation.

Most of the pulps or slurries consist of a finely divided solids portion mixed with water or other liquid as a carrier vehicle. When a sufficient agitation is provided, the solids remain in suspension in the liquid and the liquid to solids ratio is maintained at whatever is considered a proper standard for treatment. Consequently, in storing such pulps or slurries, it is necessary to maintain the pulp or slurry under sufficient agitation to keep the solids in suspension.

In large operations, such as cement plants, for example, it is necessary to collect and retain a large tonnage of material during the storage period. Tanks or containers of a diameter in excess of 100 ft. are quite common and frequently may be as much as 150 ft. or larger. The prevailing practice in constructing tanks of this type is to have a heavy superstructure across the top of the tank including rotary members usually driven along the outer wall of the tank and carrying submerged agitator members which impart sufficient agitation to the material under treatment to maintain the solids in suspension. A design of this type requires heavy cylindrical walls and a heavy superstructure or other supporting assembly for the agitator units. Consequently, the initial cost of the installation is considerable and maintenance and replacement costs are high and the regular operation of such units is costly from the standpoint of power consumption.

The practice of the present invention represents a departure from former practice in that the agitator unit of a large treatment tank is suspended from a tower structure supported from the bottom of the tank. This requires a base mat structure usually of concrete centrally of the bottom portion and the remaining bottom area and the sides of the tank, usually cylindrical, may be formed of relatively light concrete since they are only required to confine the circulating material and do not provide structural support for the agitator assembly. With this arrangement, the only overhead structure required for the tank is a catwalk connecting a side of the tank with the top of the tower unit and preferably such catwalk will also function as support for utility lines comprising the power supply and also may be used as a structural support for the feed inlet conduit of the unit if desired. The motor and gear drive unit will be mounted on a platform at the top of the tower and supports a rotary shaft maintained in a depending position and carrying an impeller member at its lower end. The upright members of the tower are inwardly inclined from bottom to top so that the impeller unit may be of relatively large diameter and will still be able to rotate in substantial clearance with the lower portion of the tower structure.

Such a shaft may be of substantial length, such as 30 ft. or more and the impeller or propeller carried at the end of the shaft may have a diameter of as much as 12 ft., or more. In order to maintain the axis of rotation of the shaft substantially constant, a supporting structure is mounted on the bottom foundation members of the tower assembly which includes a framework including portions encompassing the shaft and maintained in spaced but close proximity to the external surface of the shaft and which have resilient contact surfaces facing the shaft so that any lateral movement thereof will be arrested within close limits and without causing any bump or excessive wear on the shaft. Preferably, the enclosing surfaces are sectional and separately demountable so that service and inspection may be provided in a simple and easy manner.

The aforesaid novel features of the present invention provide a substantial reduction in cost of an original agitator tank assembly of a given size, much lower power consumption in regular operation and an effective agitation action for maintaining the confined material in suspension.

The practice of my invention will be described with reference to the accompanying drawings illustrating a typical installation embodying features of the invention. In the drawings, in the several views of which like parts bear similar reference numerals, FIG. 1 is a fragmentary vertical section through an agitator tank having a tower supported agitator assembly taken as a developed section along the line 1—1, FIG. 2;

FIG. 2 is a fragmentary top plan view of the agitator tank of FIG. 1;

FIG. 3 is a top plan view of the shaft stabilizer assembly shown in FIG. 1; and

FIG. 4 is a fragmentary section taken along the line 4—4, FIG. 3.

Referring now to the drawing, the agitator illustrated in FIGS. 1 and 2 comprises a tank including cylindrical side walls 2 preferably of concrete or the like. The tank has a flat central bottom portion 3 and an intermediate inclined portion 4 sloping upwardly from the bottom portion to the side walls. An elongated conduit 5 is disposed on the inclined portion and has an intake at the lower end of the intermediate portion and a discharge outlet for the product at the bottom of the side wall. This conduit has a valve control 6 in the discharge outlet which controls the product discharge from the tank. The inclined portion 4 and flat bottom 3 provide what will generally be referred to hereinafter as the sump portion of the tank. Material being referred to as slurry is circulated in the tank and assumes a varying level as shown at 7.

A tower assembly is disposed in the tank and includes a plurality of base supports 9 of the pedestal type. These supports 9 are circumferentially spaced at uniform distances on the bottom portion of the tank and are rigidly secured thereto to preferably dispose the tower assembly at the central axis of the tank. Four supports equally spaced are shown and this number may be increased for added strength as required. As an alternative, three supports in a tripod arrangement may be provided. A column 10 preferably of steel is attached to each support 9 and extends upwardly to approximately the top of the tank and inclines inwardly from the support. A baffle member 10x extends along column 10 throughout its vertical extent. Cross bracing is shown for stabilizing these columns.

A platform 11 is supported by and attached to the upper ends of the columns. Hand railing 12 is provided for the platform. A gear-type drive 13 is disposed on the platform and comprises a drive motor coupled by V-belts to a worm-gear reducer. A coupling 14 preferably of the type disclosed in Patent No. 3,097,006, assigned to the same assignee, is attached to the gear-type drive 13. This coupling is connected to the gear-type drive and between the output shaft of the drive and a depending shaft 16 so as to rotate shaft 16 in response to rotation of the gear-type drive. The output shaft of the drive 13 extends through the central portion of the platform, thereby supporting the shaft 16 in a depending position from the center of the platform. At the lower end of the shaft 16 there is provided an impeller 17 horizontally disposed and in proximity to the bottom portion of the tank. The impeller is of the axial flow type which gives a column effect in circulating the slurry in the tank in a manner discussed more fully hereinafter.

A catwalk 19 extends from the side wall of the tank to the platform and is supported thereby for access to the platform. In addition, the catwalk supports utility lines 20 which may provide electrical power to the drive motor or feed support means to the tank, or both.

In tanks of substantial depth, a stabilizer assembly generally indicated by numeral 22 is attached to the tower assembly by crossbeams 23 in the lower portion of the tank. The detail of stabilizer assembly 22 is illustrated in FIGS. 3 and 4. A plurality of shoe members 25 having resilient wear surfaces and curved inner surfaces surround the shaft (not shown) in near proximity to the external surface of the shaft. The shoe members are preferably made of rubber or the like. Each shoe member is bonded to a backing member 26 for additional support and attachment of the shoe member 25.

A collar 27 surrounds the shaft 16 and has upper and lower flange portions 28 and 29, respectively. The backing member fastens to the inner surface of the collar by a plurality of spaced fasteners, thereby holding the shoe members in near proximity to the external surface of the shaft.

The flanged portions 28 and 29 of the collar when assembled are square in shape and are formed in two sections 27a and 27b, each spanning an arc of about 180 degrees. One or a plurality of shoe members 25 may be provided on each section. FIGS. 3 and 4 illustrate three spaced shoe members 25 on each said section.

Four cross-beams 23 disposed at about 90 degree angles extend from the tower assembly at the base of the columns and terminate in spaced proximity to the external surface of shaft 16. The upper and lower flange portions 28 and 29 of the collar are spaced to slide over the ends of the crossbeams in close fitting relationship. Each section 27a or 27b is removably fastened between the ends of two adjoining crossbeams 23. This attachment is shown preferably as three spaced apertures adjoining each end of the section in both upper and lower flange portions which aline with corresponding apertures in the cross-beam. Fasteners such as bolt and nut assemblies 31 extend through the alined apertures to removably fasten each section.

Removal of a worn shoe member 25 is easily accomplished by unfastening one said member by detaching the associated fasteners 30. The shoe member may be easily removed and replaced by raising it through the space between shaft 16 and collar 27. As shown in FIG. 4, this space is closed below the seated position of shoe members 25 by an extension portion 33 on flange 29 which prevents a loose shoe member from falling below plate or flange 29. Substitution of a single shoe member is easily accomplished without removal of the collar 27 to free the entire stabilizer assembly. This stabilizer assembly with the flexible shoe members surrounding the external surface of the shaft as described limits the lateral movement of the shaft during rotation and permits simple inspection or repair.

Stabilizer assemblies of the type shown and described are only required in tanks having relatively long shafts. When required, the stabilizer assembly as described and illustrated prevents excessive wobble or misalignment of the shaft and thereby avoids excessive stress on the drive mechanism and coupling.

In any of the arrangements shown and described, adequate agitation is provided to maintain the material under treatment fluent and preventing settling of solids in suspension. The blade arrangement shown on impeller 17 of FIG. 1 induces downward circulation of the fluent material in a vortex action directed into the sphere of rotation of the impeller, while the blades direct the fluent material upwardly external of the vortex zone. The forces imparted by such circulation are distributed throughout the extent of the fluent body in the tank and thus maintain the solids in suspension whether in the flow of cyclic circulation or outside same.

The structural arrangements shown in the drawings represent preferred combinations utilized in the practice of my invention, and changes and modifications may be availed of within the spirit and scope of the invention is defined in the hereunto appended claims.

I claim:

1. An agitator comprising a tank having a closed bottom portion and cylindrical side walls, means for discharging contained material from the tank, a tower assembly disposed in a central portion of the tank including a plurality of upright columns extending upwardly from a support position on the tank bottom to approximately the top of the tank, platform means supported at the top of said columns, drive means on said platform means, a rotary shaft supported in a depending position with a free end portion adjoining but in spaced relation to the bottom of the tank and in driven relation to the drive means, and an impeller carried on said shaft adjacent said free end portion for rotation therewith in proximity to the bottom of said tank, the tower assembly providing the sole structural support for said shaft and impeller.

2. An agitator comprising a tank having a closed bottom portion and cylindrical side walls, means for discharging contained material from the tank, a tower assembly disposed in the tank including upright columns extending upwardly from a support position on the tank bottom to approximately the top of the tank, platform means supported at the top of said columns, drive means on said platform means, a rotary shaft supported in a depending position with a free end portion adjoining but in spaced relation to the bottom of the tank and in driven relation to said drive means, an impeller carried on said shaft adjacent said free end portion for rotation therewith in proximity to the bottom of said tank, and a stabilizer assembly supported in a lower portion of the tank above said impeller and having enclosing portions surrounding and in near proximity to an external surface of the shaft for limiting lateral movement of the shaft during its rotation.

3. An agitator comprising a tank having a flat, closed bottom portion and cylindrical side walls, means for discharging contained material from the tank, a tower assembly disposed in a central portion of the tank including a plurality of circumferentially-spaced, upright columns extending from a support position on the tank bottom to approximately the top of the tank, platform means supported at the top of said columns, drive means on said platform means, upper bearing means for coupling a rotary shaft in a depending position with a free end portion adjoining but in spaced relation to the bottom of the tank and in driven relation to said drive means, lower bearing means in proximity to the free end of the shaft in which said shaft is journaled and an impeller carried on said shaft adjacent said free end portion for rotation therewith in proximity to the bottom of said tank, the tower assembly providing the sole structural support for said shaft and impeller.

4. An agitator comprising a tank having a closed bottom including a central substantially flat portion and sloping portions extending outwardly therefrom and terminating in cylindrical side walls, means for discharging contained material from the tank, a tower assembly disposed in the central portion of the tank including a plurality of circumferentially spaced supports secured on a bottom portion of the tank, an upright column extending upwardly from each support to approximately the top of the tank, platform means supported at the top of said columns, drive means on said platform means, upper bearing means supported from the platform at the top of the supports for coupling the drive means to a rotary shaft supported in a depending position with a free end portion adjoining but in spaced relation to the bottom of the tank and in driven relation to said drive means, lower bearing means in proximity to the free end of the shaft in which said shaft is journaled and an impeller carried on said shaft adjacent said free end portion for rotation therewith in proximity to the bottom of said tank, the tower assembly providing the sole structural support for said shaft and impeller.

5. An agitator comprising a tank having a closed bottom portion and cylindrical side walls, means for discharging contained material from the tank, a tower assembly disposed in a central portion of the tank including a plurality of circumferentially spaced supports secured on a bottom portion of the tank, an upright column extending upwardly from each support to approximately the top of the tank, platform means supported at the top of said columns, drive means on said platform means, a rotary shaft supported in a depending position with a free end portion adjoining but in spaced relation to the bottom of the tank and in driven relation to said drive means upper bearing, means supported from the platform at the top of the supports coupling the drive means to the rotary shaft, and an impeller carried on said shaft adjacent said free end portion for rotation therewith in proximity to the bottom of said tank, the tower assembly providing the sole structural support for said shaft and impeller.

6. An agitator comprising a tank having a closed bottom portion and cylindrical side walls, means for discharging contained material from the tank, a tower assembly disposed in the tank including a plurality of circumferentially spaced supports secured on a bottom portion of said tank, an upright column extending upwardly from each support to approximately the top of the tank, platform means supported at the top of said columns, drive means on said platform means, a rotary shaft and impeller assembly supported in a depending position from the platform with a free end portion adjoining but in spaced relation to the bottom of the tank, upper bearing means supported from the platform at the top of the supports coupling the drive means to the rotary shaft, and a stabilizer assembly supported in a lower portion of the tank above said impeller and having enclosing portions surrounding and in near proximity to an external surface of the shaft for limiting lateral movement of the shaft during its rotation.

7. An agitator comprising a tank having a closed bottom portion and cylindrical side walls, at least one peripheral discharge adjacent the bottom of the tank, a tower assembly disposed in the tank including a plurality of circumferentially spaced supports secured on a bottom portion of said tank, an upright column extending upwardly from each support to approximately the top of the tank, platform means supported at the top of said columns, drive means disposed on said platform, a rotary shaft and impeller assembly supported in a depending position from the platform means, and a stabilizer assembly supported by said tower assembly in a lower portion of the tank and having flexible portions surrounding and in near proximity to an external surface of the shaft for limiting lateral movement of the shaft during its rotation.

8. An agitator comprising a tank including cylindrical side walls and having a flat central bottom portion and another portion inclining upwardly therefrom to the side walls, a valve-controlled discharge conduit disposed on said inclined portion having an intake at a lower elevation than a discharge outlet which extends through the side wall of the tank, a tower assembly disposed in the tank including a plurality of circumferentially spaced supports secured on the flat bottom portion of said tank, upright column extending upwardly from each support to approximately the top of the tank, a platform supported at the upper ends of said columns, drive means disposed on said platform, coupling means coupling the drive means to a rotary shaft and impeller assembly and supporting said shaft and impeller assembly in a depending position from the platform, and a stabilizer assembly supported by said tower assembly in a lower portion of the tank and having flexible portions surrounding and in near proximity to an external surface of the shaft for limiting lateral movement of the shaft during its rotation.

9. An agitator comprising a tank having a closed bottom portion and cylindrical side walls, at least one peripheral discharge adjacent the bottom of the tank, a tower assembly disposed in the tank including circumferentially spaced supports secured on a bottom portion of said tank, an upright column extending upwardly from each support to approximately the top of the tank, platform means supported at the top of said columns, drive means on said platform means, coupling means coupling the drive means to a rotary shaft and impeller assembly and supporting said shaft and impeller assembly in a depending position from the platform, a stabilizer assembly supported by said tower assembly in a lower portion of the tank and having sectional flexible portions surrounding and in near proximity to an external surface of the shaft for limiting lateral movement of the shaft during its rotation.

10. An agitator comprising a tank having a closed bottom portion and cylindrical side walls, at least one peripheral discharge adjacent the bottom of the tank, a tower assembly disposed in the tank including four circumferentially spaced supports secured on a bottom portion of said tank, an upright column extending upwardly from each support to approximately the top of the tank, platform means supported at the top of said columns, drive means on said platform means, a rotary shaft and impeller assembly supported in a depending position from the platform with a free end portion adjoining but in spaced relation to the bottom of the tank, and a stabilizer assembly supported by said tower assembly in a lower portion of the tank above said impeller by a cross piece extending inwardly from at least one of said supports, said stabilizer assembly having enclosing portions surrounding and in near proximity to an external surface of the shaft for limiting lateral movement of the shaft during its rotation.

11. An agitator comprising a tank having a closed bottom portion and cylindrical side walls, at least one peripheral discharge adjacent the bottom of the tank, a tower assembly disposed in the tank including a plurality of circumferentially spaced supports secured on the bottom portion of said tank, an upright column extending upwardly from each support to approximately the top of the tank and a platform supported at the upper ends of said columns, drive means disposed on said platform, coupling means coupling the drive means to a rotary shaft and supporting said shaft in a depending position from the platform, an impeller on the lower end of said shaft in close proximity to the bottom portion of the tank, a stabilizer assembly supported by said tower assembly in a lower portion of the tank and having enclosing portions surrounding and in close proximity to an external surface of the shaft for limiting lateral movement of the shaft during rotation of the shaft and impeller by the drive means.

12. An agitator comprising a tank having a closed bottom portion and cylindrical side walls, at least one peripheral discharge adjacent the bottom of the tank, a tower assembly disposed in the tank including a plurality of circumferentially spaced supports secured on a bottom portion of said tank, an upright column extending upwardly from each support to approximately the top of the tank, platform means supported at the top of said columns, drive means on said platform means, a rotary shaft and impeller assembly supported in a depending position from the platform, and a stabilizer assembly supported by said tower assembly in a lower portion of the tank and including a plurality of individually removable shoe members having resilient wear surfaces surrounding and in near proximity to an external surface of the shaft for limiting lateral movement of the shaft during its rotation.

13. An agitator comprising a tank having a closed bottom portion and cylindrical side walls, at least one peripheral discharge adjacent the bottom of the tank, a tower assembly disposed in the tank including a plurality of circumferentially spaced supports secured on the bottom portion of said tank, an upright column extending upwardly from each support to approximately the top of the tank and a platform supported at the upper ends of said columns, a catwalk supported at its ends by and spanning the top of said side wall and said platform, drive means disposed on said platform, coupling means coupling the drive means to a rotary shaft and impeller assembly and supporting said shaft and impeller assembly in a depending position from the platform, and a stabilizer assembly supported by said tower assembly in a lower portion of the tank and having flexible portions surrounding and in close proximity to an external surface of the shaft for limiting lateral movement of the shaft during rotation of the shaft and impeller assembly by the drive means.

14. An agitator as set forth in claim 1 wherein said tower assembly includes at least four columns supported in approximately equally spaced relationship within the tank.

15. An agitator comprising a tank having a closed bottom portion and cylindrical side walls, means for discharging contained material from the tank, a tower assembly disposed in a central portion of the tank including a rigid base at the bottom of the tank supporting a plurality of upright columns extending upwardly from the rigid base to approximately the top of the tank, platform means supported at the top of the columns, drive means on said platform means, a rotary shaft supported in a depending position with a free end portion adjoining but in spaced relation to the bottom of the tank and in driven relation to said drive means, and an impeller carried on said shaft adjacent said free end portion for rotation therewith in proximity to the bottom of the tank, said rigid base having top surface portions disposed in a lower portion of the tank above said impeller, a stabilizer assembly having enclosing portions surrounding and in near proximity to an external surface of the shaft for limiting lateral movement, said stabilizer assembly being supported by cross pieces secured at one end on the top surface portions of said base, the tower assembly providing the sole structural support for said shaft and impeller.

References Cited

UNITED STATES PATENTS

| | | | |
|---|---|---|---|
| 3,154,601 | 10/1964 | Kalinske et al. | 259—7 X |
| 3,204,768 | 9/1965 | Daniel | 259—7 X |
| 2,516,917 | 8/1950 | Roubal | 259—108 |
| 2,531,760 | 11/1950 | Woolsey | 259—95 |
| 2,631,017 | 3/1953 | Gibson et al. | 259—97 |
| 2,680,602 | 6/1954 | Nelson et al. | 259—97 |

ROBERT W. JENKINS, *Primary Examiner.*